(12) United States Patent　　　　　(10) Patent No.:　US 12,663,811 B2

Jung et al.　　　　　　　　　　　　　(45) Date of Patent:　Jun. 23, 2026

(54) MOBILE ROBOT AND CONTROL METHOD THEREFOR

(71) Applicant: SAMSUNG ELECTRONICS CO., LTD., Suwon-si (KR)

(72) Inventors: Euihyun Jung, Suwon-si (KR); Jinwook Yoon, Suwon-si (KR); Wonyoung Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 31 days.

(21) Appl. No.: 18/671,115

(22) Filed: May 22, 2024

(65) Prior Publication Data

US 2024/0310855 A1　　　Sep. 19, 2024

Related U.S. Application Data

(63) Continuation of application No. PCT/KR2022/019195, filed on Nov. 30, 2022.

(30) Foreign Application Priority Data

Jan. 26, 2022　　(KR) ......................... 10-2022-0011742

(51) Int. Cl.
　　*A01K 15/02*　　　(2006.01)
　　*A61L 9/12*　　　(2006.01)
　　　　　　(Continued)

(52) U.S. Cl.
　　CPC ......... *G05D 1/648* (2024.01); *G05D 2105/31* (2024.01)

(58) Field of Classification Search
　　CPC ................ G05D 1/648; G05D 2105/31; A61L 2209/111; A61L 9/125; B25J 13/086;
　　　　　　(Continued)

(56) References Cited

U.S. PATENT DOCUMENTS

| | | |
|---|---|---|
| 7,900,694 B2 | 3/2011 | Jee et al. |
| 2005/0194460 A1 | 9/2005 | Selander |

(Continued)

FOREIGN PATENT DOCUMENTS

| | | |
|---|---|---|
| JP | 2018-78869 | 5/2018 |
| KR | 10-0548894 | 2/2006 |

(Continued)

OTHER PUBLICATIONS

International Search Report, PCT/ISA/210, dated Feb. 24, 2023, in PCT Application No. PCT/KR2022/019195.

(Continued)

*Primary Examiner* — Adam R Mott
*Assistant Examiner* — Heather J Keniry
(74) *Attorney, Agent, or Firm* — STAAS & HALSEY LLP

(57)　　　　　　ABSTRACT

A mobile robot according to an embodiment of the present disclosure comprises: a main body; a rotation portion which is disposed on a side surface of the main body and movably supports the main body; a storage box disposed inside the main body to store smell substances; a smell discharge passage formed to discharge smell from the storage box to the outside of the main body; an opening and closing portion disposed to open and close a space between the storage box and the smell discharge passage; a delivery passage disposed to guide the air flowing by the rotation of the rotation portion, to the smell discharge passage; and a control unit for controlling driving of the rotation portion and the opening and closing portion.

15 Claims, 12 Drawing Sheets

(51) Int. Cl.
  *B25J 5/00*        (2006.01)
  *B25J 11/00*       (2006.01)
  *B25J 13/08*       (2006.01)
  *G05D 1/648*       (2024.01)
  *G05D 105/30*      (2024.01)

(58) Field of Classification Search
  CPC . B25J 13/081; B25J 11/003; B25J 5/00; B25J
              13/084; A01K 15/02; A01K 15/025
  See application file for complete search history.

(56)              References Cited

U.S. PATENT DOCUMENTS

2007/0051757 A1 * 3/2007 Lim ..................... A47L 9/2852
                                                     222/630
2012/0097114 A1   4/2012 Scott
2017/0064926 A1 * 3/2017 Gutierrez ............. G05B 19/042
2020/0348324 A1 * 11/2020 Wikholm ............... G05D 1/246
2023/0248192 A1 * 8/2023 Brown ..................... A47L 5/22
                                                     15/320

FOREIGN PATENT DOCUMENTS

| KR | 10-1117855 | 3/2012 |
| --- | --- | --- |
| KR | 10-1307783 | 9/2013 |
| KR | 10-2017-0107341 | 9/2017 |
| KR | 10-1898661 | 9/2018 |
| KR | 10-1954610 | 3/2019 |
| KR | 10-2022290 | 9/2019 |
| KR | 10-2019-0111465 | 10/2019 |
| KR | 10-2020-0100532 | 8/2020 |
| KR | 10-2021-0084104 | 7/2021 |
| KR | 10-2021-0101015 | 8/2021 |
| KR | 10-2021-0128609 | 10/2021 |

OTHER PUBLICATIONS

Office Action issued on Apr. 30, 2026, in counterpart Korean Patent
Application No. 10-2022-0011742.

* cited by examiner

MOBILE ROBOT AND CONTROL METHOD THEREFOR

CROSS-REFERENCE TO RELATED APPLICATIONS

This application is a continuation of International Application PCT/KR2022/019195, filed Nov. 30, 2022, and claims foreign priority to Korean Application 10-2022-0011742, filed Jan. 26, 2022, which are incorporated herein by reference in their entireties.

BACKGROUND

Field

Various embodiments of the disclosure relate to a mobile robot and a method for controlling the same.

Description of Related Art

With the advancement of robot technology, robots have been widely used not only in specialized academic fields or industries requiring large-scale labor, but also in general households. Further, mobile robots which are able to move, as well as robots which perform functions at fixed locations, are spreading.

Recently, in addition to those that serve as assistants to increase users' convenience indoor, mobile robots capable of playing with pets are also being developed. When left alone indoors, a pet may feel emotionally anxious due to loneliness and missing its owner. Accordingly, continuous research efforts have been made to methods for taking care of pets not to experience emotional anxiety even when they are not with their owners.

SUMMARY

Various embodiments of the disclosure may provide a structure for increasing the diffusion rate of an odorous substance using a flow of air generated by a rotating part of a mobile robot.

According to an embodiment of the disclosure, a mobile robot may include a main body; a rotating part configured to rotate to move the main body; a storage box inside the main body to store an odorous substance; an odor discharge flow path through which odor from an odorous substance stored in the storage box passes to be discharged to an outside of the main body; a valve assembly configured to open or close to control diffusion of the odor through the odor discharge flow path; a transfer flow path configured to guide a flow of air generated by rotation of the rotating part to the odor discharge flow path; and a controller configured to control rotation of the rotating part and opening and closing of the valve assembly.

According to an embodiment of the disclosure, the rotating part may include a rib protruding inward.

According to an embodiment of the disclosure, the rotating part and the rib may be configured so that, when the rotating part rotates, the flow of air is generated by the rib.

According to an embodiment of the disclosure, a portion of the odor discharge flow path may be configured to form a curved surface protruding inward so that the flow the air flows along the curved surface.

According to an embodiment of the disclosure, the storage box may include an opening to allow the odorous substance to be drawn in or out of the storage box, and a door configured to open or close the opening.

According to an embodiment of the disclosure, the storage box may be behind the main body.

According to an embodiment of the disclosure, the mobile robot may further include a distance sensor configured to detect a distance to a detection object; and a touch sensor configured to detect contact of the detection object with the mobile robot, wherein the controller is configured to measure a degree of interest of the detection object using at least one of the distance detected by the distance sensor or the contact detected by the touch sensor.

According to an embodiment of the disclosure, the controller may be configured to determine, using at least one of the distance detected by the distance sensor or the contact detected by the touch sensor, that the degree of interest decreases as the distance to the detection object increases or that the degree of interest decreases as a frequency at which contact with the mobile robot decreases, and open the valve assembly when the degree of interest of the detection object is lower than a preset reference value.

According to an embodiment of the disclosure, the valve assembly may be configured to open or close between the storage box and the odor discharge flow path, and the controller may be configured to control the valve assembly to release odor of the odorous substance from the storage box to the odor discharge flow path.

According to an embodiment of the disclosure, the mobile robot may further include a weight sensor configured to detect a weight of an odorous substance stored in the storage box, wherein the controller may be configured to visually or audibly provide an alarm indicating that replacement of an odorous substance stored in the storage box is required when the weight detected by the weight sensor decreases by a preset ratio or less to an initial weight.

According to an embodiment of the disclosure, the mobile robot may further include a pH sensor configured to detect an acidity of an odorous substance stored in the storage box, wherein the controller may be configured to visually or audibly provide an alarm indicating that replacement of an odorous substance stored in the storage box is required when the acidity detected by the pH sensor is changed by a preset value or more relative to an initial acidity.

According to an embodiment of the disclosure, the valve assembly may include a valve positioned between the storage box and an inlet of the odor discharge flow path; and a valve motor configured to rotate the valve to open or close a space between the storage box and the odor discharge flow path.

According to an embodiment of the disclosure, the method for controlling a mobile robot may include calculating a degree of interest of a detection object using at least one of the distance detected by a distance sensor or the contact detected by a touch sensor; controlling, based on the calculated degree of interest, diffusion of an odor of an odorous substance stored in a storage box by controlling a valve assembly; and controlling rotation of a rotating part to move the mobile robot and so that the flow of air generated by rotation of the rotating part is guided to the storage box.

According to an embodiment of the disclosure, the method may further include determining whether the degree of interest decreases while the mobile robot moves; and
    controlling the valve assembly to increase a degree of
        opening of the storage box when the degree of interest
        is determined to decrease while the mobile robot
        moves.

According to an embodiment of the disclosure, the calculating may include determining that the degree of interest decreases as a distance to the detection object increases or that the degree of interest decreases as a frequency at which the detection object touches the mobile robot decreases, and the method may further include controlling the valve assembly based on determining that the degree of interest decreases.

DETAILED DESCRIPTION

Figure 1:
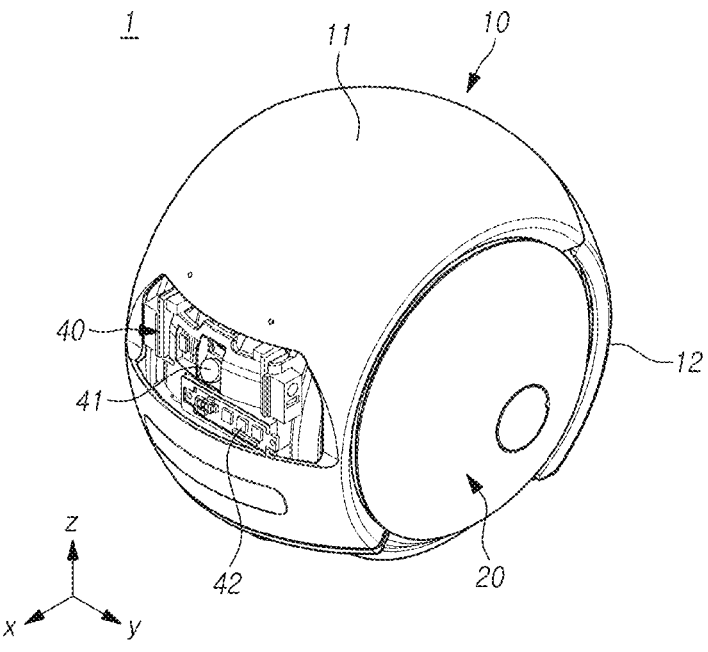
FIG. 1 is a perspective view schematically illustrating a mobile robot according to an embodiment of the disclosure.

Embodiments of the present invention are now described with reference to the accompanying drawings in such a detailed manner as to be easily practiced by one of ordinary skill in the art. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

Figure 2:
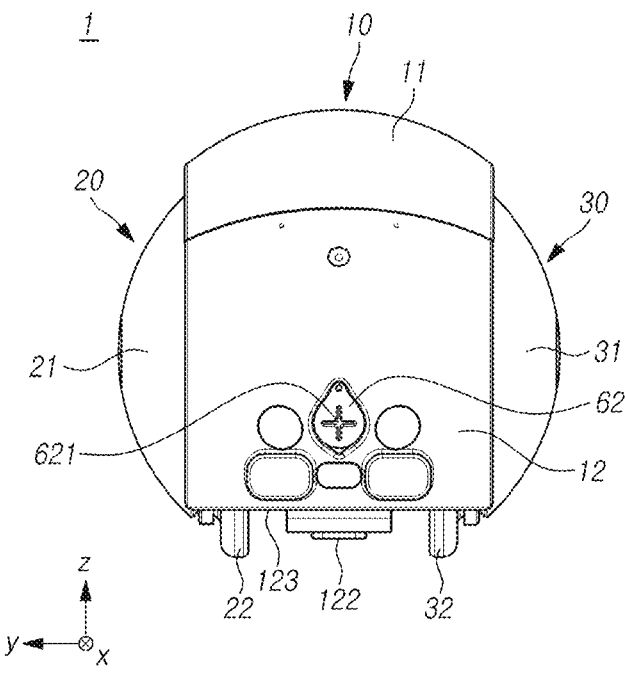
FIG. 2 is a rear view illustrating a mobile robot according to an embodiment of the disclosure.

FIG. 1 is a perspective view schematically illustrating a mobile robot according to an embodiment of the disclosure. FIG. 2 is a rear view illustrating a mobile robot according to an embodiment of the disclosure. Hereinafter, overall functions of the mobile robot 1 are described with reference to FIGS. 1 and 2.

According to an embodiment, the mobile robot 1 may have various functions, such as recognizing an ambient environment, autonomous driving and gathering information, and sending information to the user. The mobile robot 1 may recognize the ambient environment based on, e.g., voice, sound, or image recognition. The mobile robot 1 may transmit and receive signals to and from other electronic products or control other electronic products using, e.g., wireless communication.

According to an embodiment, the mobile robot 1 may include a driving member. The driving member may be, e.g., the first rotating part 20 or the second rotating part 30 as illustrated. According to an embodiment, the first rotating part 20 and the second rotating part 30 each may be disposed on the left or right side of the mobile robot 1. For example, the mobile robot 1 may control the driving speed or the driving direction by independently controlling the rotation of the first rotating part 20 and the second rotating part 30. The mobile robot 1 may monitor the ambient environment while driving indoors or outdoors using, e.g., the first rotating part 20 and the second rotating part 30, and execute various functions accordingly. For example, when the mobile robot 1 is used in the home, the mobile robot 1 may interact with an electronic device such as a TV, a cleaner, a washing machine, etc. disposed in the home to execute a function and gather information, and transfer the gathered information to a family member including a pet. Accordingly, family members may be connected to electronic devices disposed in the home using the mobile robot 1.

According to an embodiment, the mobile robot 1 may continuously check or monitor the ambient environment even when the user is absent. For example, when the user is absent, the mobile robot 1 may connect the user with a pet or other family members in the home.

In addition to the above description, the mobile robot 1 may implement various embodiments for assisting the user in daily life or work.

Referring to FIGS. 1 and 2, the mobile robot 1 according to an embodiment of the disclosure may include a main body 10, an ambient environment detector 40, a first rotating part 20, or a second rotating part 30. The first rotating part 20 and the second rotating part 30 may be disposed on two opposite sides of the main body 10. The first rotating part 20 and the second rotating part 30 may be disposed on two opposite sides to face each other, for example. The first rotating part 20 and the second rotating part 30 may support, e.g., the main body 10 so that the main body 10 is movable.

According to an embodiment, the main body 10 may form an receiving space therein. Components such as a controller (e.g., a controller 90 of FIG. 4), a first driving unit (e.g., a first driving unit 100 of FIG. 3), or a second driving unit (e.g., a second driving unit 110 of FIG. 3) may be received in the receiving space of the main body 10. The main body 10, e.g., may be partially open in the front. An ambient environment detector 40 may be disposed in the open portion of the main body 10.

Figure 3:
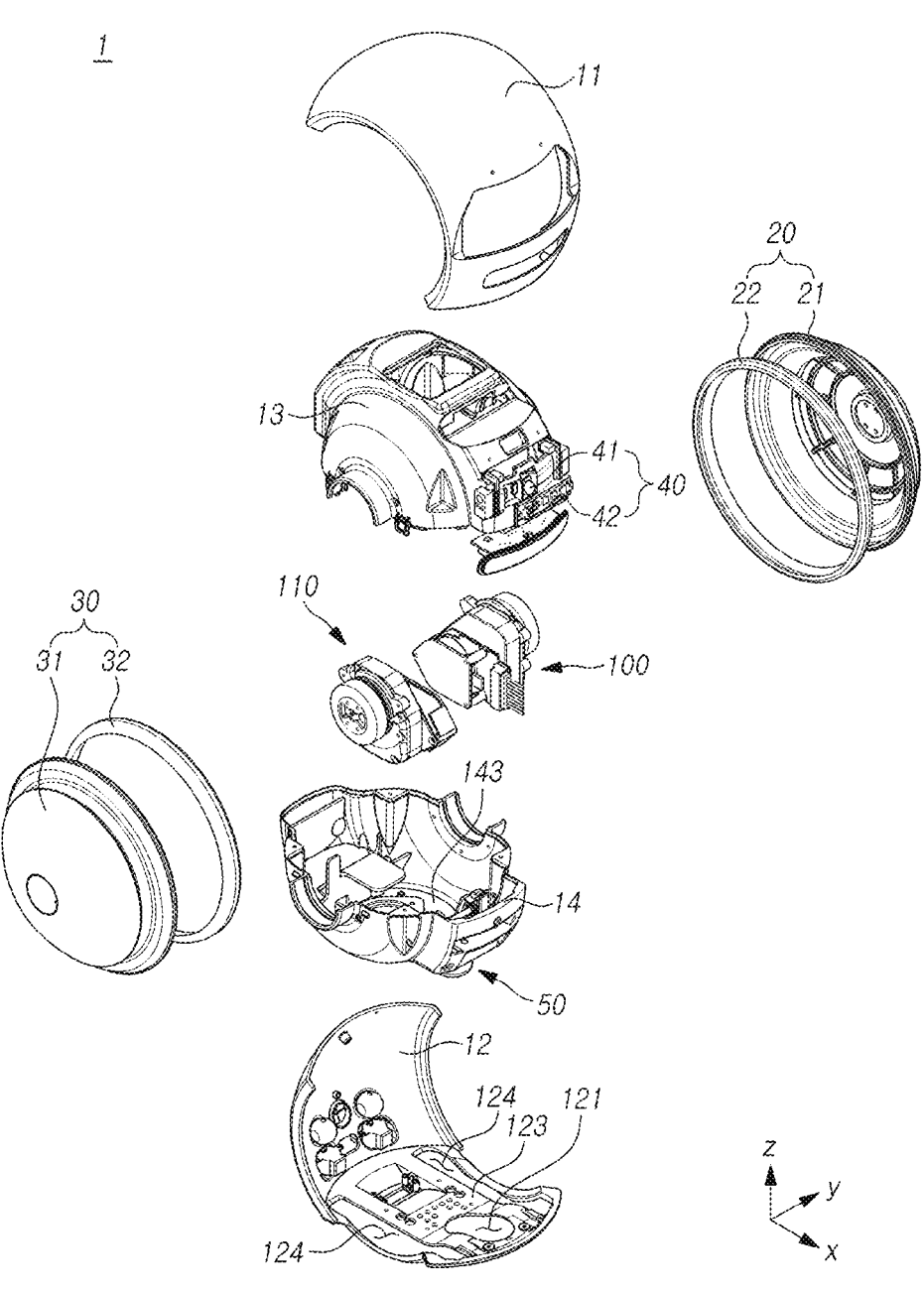
FIG. 3 is an exploded perspective view illustrating a mobile robot according to an embodiment of the disclosure.

According to an embodiment, the first rotating part 20 may be connected to the first driving unit (e.g., the first driving unit 100 of FIG. 3). The first rotating part 20 may be rotated by receiving rotational power from a first motor (e.g., a first motor 101 of FIG. 4) disposed in the first driving unit (e.g., the first driving unit 100 of FIG. 3).

According to an embodiment, the first rotating part 20 may include a first cover 21 or a first roller 22. The first cover 21 may form, e.g., an outer appearance of one lateral surface of the main body 10. The first cover 21 may be formed of, e.g., a curved surface having the same curvature as the main body 10.

For example, the first roller 22 may be disposed between the first cover 21 and the main body 10. The first roller 22 may be, e.g., a tire formed of rubber, but is not limited thereto.

According to an embodiment, the second rotating part 30 may be connected to the second driving unit (e.g., the second driving unit 110 of FIG. 3). The second rotating part 30 may be rotated by receiving rotational power from a second motor (e.g., a second motor 111 of FIG. 4) disposed in the second driving unit (e.g., the second driving unit 110 of FIG. 3).

According to an embodiment, the second rotating part 30 may include a second cover 31 or a second roller 32. The second cover 31 may form, e.g., an outer appearance of the other side surface of the main body 10. The second cover 31 may be formed of, e.g., a curved surface having the same curvature as the main body 10.

The second roller 32 may be disposed between, e.g., the second cover 31 and the main body 10. The second roller 32 may be, e.g., a tire formed of rubber, but is not limited thereto.

According to an embodiment, the ambient environment detector 40 may include a camera 41 or a distance sensor 42. The camera 41 or the distance sensor 42 may be disposed to photograph or detect, e.g., the front of the mobile robot 1. For example, a plurality of cameras 41 may be disposed to photograph in various directions. The distance sensor 42 may be configured to detect, e.g., the distance to a detection object (e.g., the pet) and estimate the position of the detection object (e.g., the pet). The distance sensor 42 may be, e.g., an ultrasonic sensor, a radar, or a LiDAR, but is not limited thereto.

Further, the mobile robot 1 may further include other types of sensors or input devices for detecting the ambient environment. For example, the mobile robot 1 may further include a microphone or an infrared sensor for sensing the ambient environment.

According to an embodiment, the main body 10, the first rotating part 20, and the second rotating part 30 may have the same curvature. Accordingly, the overall appearance of the mobile robot 1 may be disposed to form a spherical shape. A portion of the main body 10 may not form a portion of the sphere. For example, the lower housing 12 of the main body 10 may have a flat bottom.

According to an embodiment, the main body 10 may be disposed with a door 62. The door 62 may be disposed behind the main body 10, but is not limited thereto. The door 62 may be configured to be opened and closed to introduce or withdraw an odorous substance S into a storage box (e.g., the storage box 60 of FIG. 5). In other words, the user may directly open the door 62 to insert or remove the odorous substance S. The door 62 may be formed of, e.g., an elastic material.

According to an embodiment, the door 62 may include an insertion hole 621. The user may use the insertion hole 621 without opening the entire door 62 when inserting the odorous substance S. When the user presses the insertion hole 621 portion using the odorous substance S, a peripheral portion of the insertion hole 621 may be deformed inward by elasticity. After the odorous substance S is seated in the storage box 60, the insertion hole 621 may return to its original shape. The insertion hole 621 may normally have a cross shape as shown, but is not limited thereto. The insertion hole 621 may be configured so that the gap is opened to allow the odor of the odorous substance S in the storage box 60 to be discharged to the outside through the insertion hole 621, but is not limited thereto, and the insertion hole 621 may be configured to seal the storage box 60 in normal circumstances, i.e., except for when the user presses the insertion hole 621 to try to insert the odorous substance S.

FIG. 3 is an exploded perspective view illustrating a mobile robot according to an embodiment of the disclosure.

Referring to FIG. 3, a mobile robot 1 may include a main body 10, a first rotating part 20, a second rotating part 30, an ambient environment detector 40, or a bending roller 50. The main body 10, the first rotating part 20, the second rotating part 30, and the ambient environment detector 40 illustrated may be wholly or partially the same as the main body 10, the first rotating part 20, the second rotating part 30, and the ambient environment detector 40 of FIG. 1 or 2. Therefore, descriptions overlapping those of FIGS. 1 and 2 will be omitted. FIG. 3 omits illustration of components accommodated in the main body 10, such as a driving assembly or a controller for transmitting power to the first rotating part 20 or the second rotating part 30, for convenience of description.

According to an embodiment, the main body 10 may include an upper housing 11, a lower housing 12, an upper frame 13, or a lower frame 14. The upper housing 11 and the lower housing 12 may form, e.g., an outer appearance of the mobile robot 1. The upper housing 11 and the lower housing 12 may be disposed, e.g., between the first rotating part 20 and the second rotating part 30. According to an embodiment, the upper housing 11 and the lower housing 12 may be integrally formed. According to an embodiment, the main body 10 may form an outer appearance by combining three or more housings.

The upper frame 13 and the lower frame 14 may be disposed, e.g., in the upper housing 11 and the lower housing 12. The upper frame 13 and the lower frame 14, e.g., may be disposed to protect various components disposed inside the main body 10 from external shocks or to arrange and fix various components at predetermined positions.

According to an embodiment, the lower housing 12 may have a flat bottom. The mobile robot 1 has a substantially spherical shape as a whole, but the lower portion of the lower housing 12 may have a concave shape. The lower housing 12 may be formed to be open at positions corresponding to the first roller 22 and the second roller 32. In other words, the first roller 22 and the second roller 32 may be disposed to pass through the lower housing 12. Accordingly, when the first rotating part 20 and the second rotating part 30 touch the ground, the lower housing 12 may be disposed to be spaced apart from the ground by a predetermined distance. For example, the lower housing 12 may be disposed to be 15 mm away from the ground, but is not limited thereto. As the lower housing 12 is spaced apart from the ground, the lower housing 12 may not collide with a stepped portion, such as a threshold, when the mobile robot 1 travels over the stepped portion. In other words, as the lower housing 12 is formed in a flat surface so as to be spaced apart from the ground, the mobile robot 1 overall having a spherical shape may pass over the stepped portion.

The lower housing 12 may be disposed to surround, e.g., at least a portion of the lower frame 14, a portion of the first rotating part 20, and a portion of the second rotating part 30, but is not limited thereto.

According to an embodiment, a lower flat surface 123 of the lower housing 12 may be disposed with a housing opening 121 partially open. The housing opening 121 may be, e.g., a space in which the bending roller 50 may protrude downward or be inserted thereinto. The housing opening 121 may be disposed, e.g., in the front of the lower portion of the lower housing 12.

According to an embodiment, the lower housing 12 may be disposed with a rear support portion 122. The rear support portion 122 may be disposed, e.g., in the rear of the lower portion of the lower housing 12. The rear support portion 122 may be a cylindrical roller, but is not limited thereto. The rear support portion 122 may support the rear of the mobile robot 1. Accordingly, the rear support portion 122 may serve to support the rear of the mobile robot 1 when the mobile robot 1 is in a stationary state or in a situation in which pitching occurs backward, such as when the mobile robot 1 accelerates.

According to an embodiment, a frame opening 141 may be disposed in a lower portion of the lower frame 14. The frame opening 141 may be, e.g., a space in which the bending roller 50 may protrude downward or be inserted thereinto. The frame opening 141 may be disposed to overlap, e.g., the housing opening 121. The frame opening 141 may have a shape corresponding to, e.g., the housing opening 121. In other words, the bending roller 50 may protrude downward or be inserted inside due to the frame opening 141 and the housing opening 121.

According to an embodiment, the first rotating part 20 may include a first cover 21 or a first roller 22. The first cover 21, e.g., may be disposed to overlap one lateral side of the main body 10. The first cover 21, e.g., may have a central portion connected to the first driving unit 100 to receive rotational power from a first motor (e.g., a first motor 101 of FIG. 4) in the first driving unit 100. The first cover 21 may be formed to have the same curvature as the main body 10.

The first roller 22 may have, e.g., a ring shape. The first roller 22 may be disposed to surround, e.g., a portion forming the largest circular cross section of the first cover 21. The first roller 22 may be disposed to surround, e.g., a main body 10-side end portion of the first rotating part 20. The first roller 22 may be, e.g., a portion that rotates together when the first rotating part 20 rotates and touches the ground to generate frictional force.

According to an embodiment, the second rotating part 30 may include a second cover 31 or a second roller 32. The second cover 31 may overlap, e.g., the other lateral side of the main body 10. The second cover 31 may have, e.g., a central portion connected to the second driving unit 110 to receive rotational power from a second motor (e.g., a second motor 111 of FIG. 4) in the second driving unit 110. The first cover 21 may be formed to have the same curvature as the main body 10.

The second roller 32 may have, e.g., a ring shape. The second roller 32 may be disposed to surround, e.g., a portion forming the largest circular cross section of the second cover 31. The second roller 32 may be disposed to surround, e.g., a main body 10-side end portion of the second rotating part 30. The second roller 32 may be, e.g., a portion that rotates together when the second rotating part 30 rotates and touches the ground to generate a frictional force.

The first roller 22 and the second roller 32 may be disposed to be parallel to each other. The first roller 22 and the second roller 32 may perform various operations such as moving the mobile robot 1 back and forth, left and right, or rotating the mobile robot 1 in place by rotating while causing friction with the ground.

According to an embodiment, the bending roller 50 may be disposed so that a portion of the bending roller 50 is accommodated in the receiving space of the main body 10 and the remaining portion of the bending roller 50 protrudes to the outside of the main body 10. For example, a portion of the bending roller 50 may protrude downward through the housing opening 121 of the lower housing 12 and the frame opening 141 of the lower frame 14. The bending roller 50 may be positioned, e.g., in front of the lower housing 12. The bending roller 50 may be disposed, e.g., to be rotatable, and may be inserted into the main body 10 through the housing opening 121 and the frame opening 141 by an external force.

According to an embodiment, the bending roller 50 may rotate between a first position maximally protruding downward of the main body 10 and a second position inserted into the main body 10. The bending roller 50 is normally located at the first position, but when the mobile robot 1 climbs the stepped portion, the bending roller 50 may be pushed by the stepped portion to rotate toward the second position. In other words, the bending roller 50 may rotate inward when an external force is applied.

According to an embodiment, the bending roller 50 may be disposed to be spaced apart from the ground by a predetermined interval in a state such as stopping, constant speed driving, or accelerated driving. For example, the bending roller 50 may be disposed to be spaced apart from the ground by 0.5 mm to 1.5 mm. While the bending roller 50 located in the front is spaced apart from the ground, the rear may be supported by the rear support portion 122. The bending roller 50 may support, e.g., the ground when the mobile robot 1 decelerates while driving. In other words, when the mobile robot 1 is pitched forward, the bending roller 50 may contact the ground to support the front of the mobile robot 1. As a result, the bending roller 50 may prevent the mobile robot 1 from being excessively pitched forward.

According to an embodiment, the mobile robot 1 may further include a storage box 60 and a valve assembly 70. For example, the mobile robot 1 may store the odorous substance S such as feed in the storage box 60 and then diffuse the odor to the outside. For example, the mobile robot 1 may adjust the degree of diffusion of the odorous substance S in the storage box 60 using the valve assembly 70.

According to an embodiment, the storage box 60 may be disposed to store the odorous substance S. According to an embodiment, the storage box 60 may include at least one opening 61. The storage box 60 may be formed by, e.g., the lower housing 12 and the lower frame 14, but may be disposed as a separate component. The storage box 60 may be disposed in the rear of the main body 10 as illustrated, but is not limited thereto. As another example, the storage box 60 may be integrally formed with the lower frame 14. The storage box 60 may have, e.g., a cylindrical shape partially open, but is not limited thereto.

According to an embodiment, the valve assembly 70 may be disposed to control diffusion of the odor of the odorous substance S stored in the storage box 60. In other words, the valve assembly 70 may be disposed to open and close the storage box 60. The valve assembly 70 may include, e.g., a first valve assembly 71 and a second valve assembly 72 disposed on two opposite sides of the storage box 60, but is not limited thereto. The first valve assembly 71 and the second valve assembly 72 may be disposed to face each other, but are not limited thereto.

According to an embodiment, the valve assembly 70 may include a valve (e.g., the first valve 712 or the second valve 722) or a valve motor (e.g., the first valve motor 711 or the second valve motor 721).

According to an embodiment, the first valve assembly 71 may include a first valve 712 or a first valve motor 711. The first valve 712 may be located, e.g., between the storage box 60 and one end (e.g., the inlet 81 of FIG. 5) of the odor discharge flow path (e.g., the odor discharge flow path 80 of FIG. 5). For example, the first valve 712 may be located in the second opening 612 of the storage box 60. The first valve 712 may be, e.g., a ball valve as shown, but is not limited thereto and may be a throttle valve. The first valve motor 711 may be connected to, e.g., the first valve 712. The first valve motor 711 may, e.g., rotate the first valve 712 to open/close the space between the storage box 60 and the odor discharge flow path (e.g., the odor discharge flow path 80 of FIG. 5). The first valve motor 711 may be controlled by, e.g., a controller (e.g., the controller 90 of FIG. 4).

According to an embodiment, the second valve assembly 72 may include a second valve 722 or a second valve motor 721. The second valve 722 may be located, e.g., between the storage box 60 and one end (e.g., the inlet 81 of FIG. 5) of the odor discharge flow path (e.g., the odor discharge flow path 80 of FIG. 5). For example, the second valve 722 may be located in the third opening 613 of the storage box 60. The second valve 722 may be, e.g., a ball valve as shown, but is not limited thereto and may be a throttle valve. The second valve motor 721 may be connected to, e.g., the second valve 722. The second valve motor 721 may, e.g., rotate the second valve 722 to open/close the space between the storage box 60 and the odor discharge flow path (e.g., the odor discharge flow path 80 of FIG. 5). The second valve motor 721 may be controlled by, e.g., a controller (e.g., the controller 90 of FIG. 4).

Figure 4:
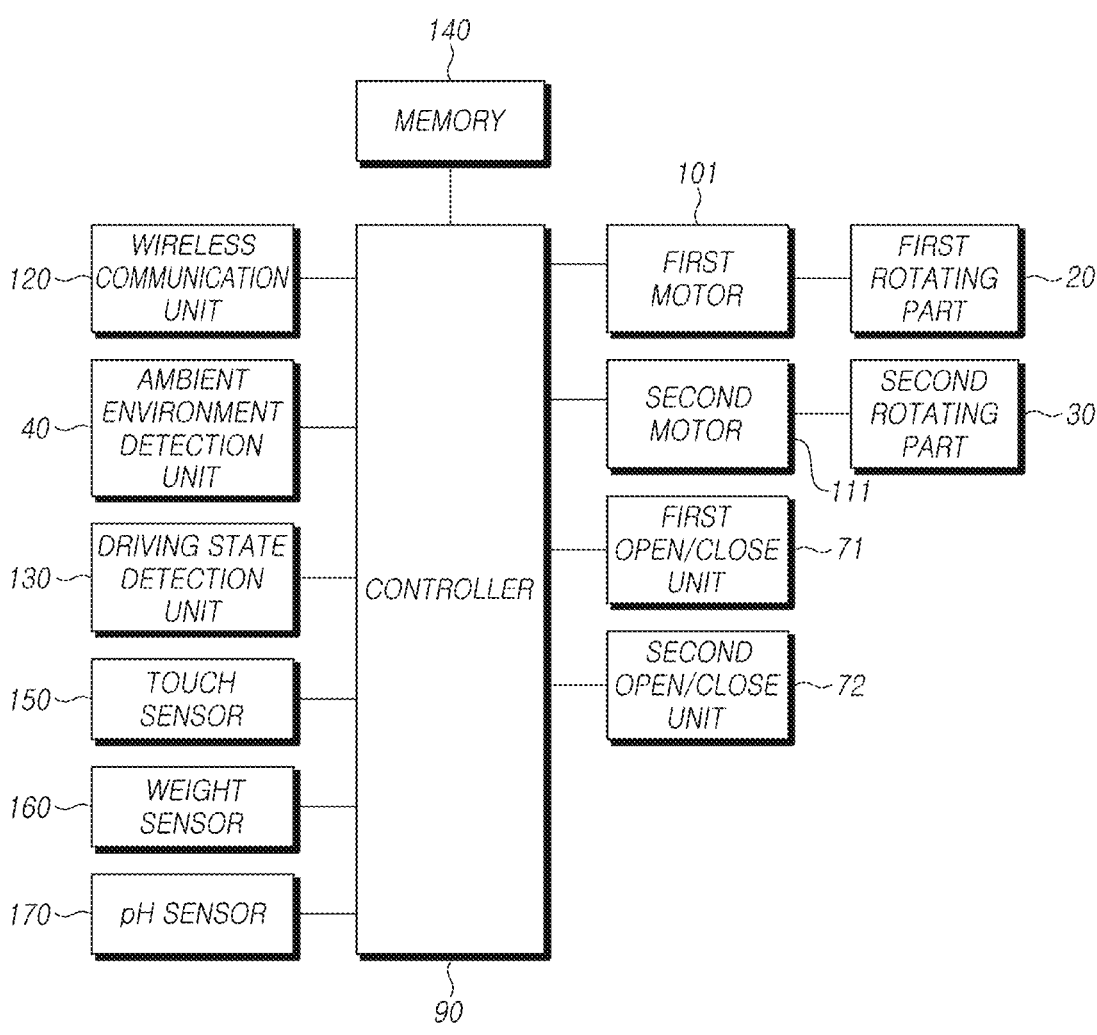
FIG. 4 is a block diagram illustrating a mobile robot according to an embodiment of the disclosure.

FIG. 4 is a block diagram illustrating a mobile robot according to an embodiment of the disclosure.

The block diagram of FIG. 4 is a view illustrating electronic devices in the mobile robot 1 interacting with the controller 90, and the components of FIG. 4 may also be included in the mobile robot 1 of FIGS. 1 to 3.

According to an embodiment, the mobile robot 1 may include a wireless communication unit 120, an ambient environment detector 40, a driving state detector 130, a memory 140, a controller 90, a first motor 101, a second motor 111, a first rotating part 20, a second rotating part 30, a first valve 71, or a second valve 72. The wireless communication unit 120, the ambient environment detector 40, the driving state detector 130, the memory 140, the controller 90, the first motor 101 or the second motor 111 may be disposed in a main body (e.g., the main body 10 of FIG. 1).

According to an embodiment, the wireless communication unit 120 may include one or more modules that enable wireless communication between the mobile robot 1 and a wireless communication system, between the mobile robot 1 and another device, or between the mobile robot 1 and an external server. According to an embodiment, the wireless communication unit 120 may include one or more modules connecting the mobile robot 1 to one or more networks. According to an embodiment, the wireless communication unit 120 may include at least one of a mobile communication module, a wireless Internet module, a short-range communication module, or a location information module.

For example, the mobile communication module may transmit/receive a wireless signal to/from at least one of a base station, an external terminal, or a server on a mobile communication network established according to technical standards or communication methods for mobile communication. The wireless signals may include, e.g., voice call signals, video call signals, or other various types of data according to transmission/reception of text/multimedia messages.

The wireless Internet module may be, but is not limited to, e.g., wireless LAN (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE- A), or 5G. Data may be transmitted and received according to at least one wireless Internet technology in the scope encompassing Internet technologies even not enumerated above.

The short-range communication module may be intended for, e.g., short-range communication and may support short-range communication using at least one of Bluetooth, radio frequency identification (RFID), infrared data association (IrDA), ultra-wideband (UWB), ZigBee, near-field communication (NFC), Wi-Fi, Wi-Fi Direct, or wireless universal serial bus (USB) technology. The short-range communication module may support, e.g., wireless communication between the mobile robot 1 and a wireless communication system, between the mobile robot 1 and another device, or between the mobile robot 1 and a network in which the other device is positioned through a short-range wireless communication network. Here, the wireless local area network may be a wireless personal area network.

The location information module may be, e.g., a global positioning system (GPS) module or a Wi-Fi module as a module for obtaining the location of the mobile robot 1. When the mobile robot 1 utilizes the GPS module, the mobile robot 1 may receive information about the location of the robot vacuum 300 using the signal transmitted from the GPS satellite. When the mobile robot 1 utilizes the Wi-Fi module, the mobile robot 1 may receive information about the location of the robot vacuum 300 based on information about a wireless access point (AP) that transmits and receives a wireless signal to and from the Wi-Fi module.

According to an embodiment, the ambient environment detector 40 may include a camera 41 or a distance sensor 42. The ambient environment detector 40 may gather information about the ambient environment of the mobile robot 1 and transmit the gathered information to the controller 90.

According to an embodiment, the camera 41 may be disposed to face forward of the mobile robot 1. Accordingly, the camera 41 may gather information about an image about a driving direction of the mobile robot 1. The camera 41 may transfer the gathered image information to the controller 90. According to an embodiment, multiple cameras 41 may be disposed to photograph in multiple directions.

According to an embodiment, the distance sensor 42 may include at least one of an ultrasonic sensor, a radar, or a LiDAR. The distance sensor 42 may be disposed to detect, e.g., a position corresponding to a position to which the camera 41 faces. The camera 41 and the distance sensor 42 may complement each other with information obtained by photographing or sensing the front of the mobile robot 1.

According to an embodiment, the ambient environment detector 40 may include a microphone, an infrared sensor, or a motion sensor to detect the ambient environment. The microphone may be used, e.g., to detect an ambient environment by gathering sound information outside the mobile robot 1.

Further, the ambient environment detector 40 may further include at least one of an illumination sensor, an environmental sensor (e.g., a barometer, a hygrometer, a thermometer, a radioactivity sensor, a heat sensor, a gas sensor, etc.), and a chemical sensor (e.g., an electronic nose, a healthcare sensor, a biometric sensor, etc.) to detect various environmental states around the mobile robot 1.

According to an embodiment, the driving state detector 130 may be disposed to detect the driving state of the mobile robot 1. According to an embodiment, the driving state detector 130 may include a hall sensor, an acceleration sensor, a magnetic sensor, a gravity sensor (G-sensor), or a gyroscope sensor. The driving state detector 130 may detect a driving speed, a driving direction, a driving acceleration, and a front or rear pitching angle of the mobile robot 1 using the sensors.

According to an embodiment, the controller 90 may control the overall operation of the mobile robot 1. To that end, the controller 90 may include one or more of a central processing unit (CPU), an application processor (AP), or a communication processor (CP). The controller 90 may be, e.g., a microcontroller (MCU).

The controller 90 may control hardware or software components connected to the controller 90 by driving, e.g., an operating system or an application program, and may perform various data processing and operations. Further, the controller 90 may load and process a command or data received from at least one of other components in a volatile memory, and store various data in a non-volatile memory.

According to an embodiment, the controller 90 may receive information from the ambient environment detector 40 or the driving state detector 130 to perform overall control on the operation of the mobile robot 1. For example, the controller 90 may control the operation of the first motor 101 or the second motor 111 to adjust the driving speed or the driving direction of the mobile robot 1.

According to an embodiment, the memory 140 may store data supporting various functions of the mobile robot 1. The memory 140 may store, e.g., a plurality of application programs or applications run on the mobile robot 1, or data or instructions for operating the mobile robot 1. At least some of these applications may be downloaded from an external server through wireless communication. Further, at least some of the application programs may be stored in the memory 140 from the time when it is shipped out for basic functions (e.g., a driving function, a home monitoring function, an image storage function, etc.) of the mobile robot 1. For example, the application program may be stored in the memory 140 and driven to perform an operation (or function) of the mobile robot 1 by the controller 90.

According to an embodiment, the first motor 101 may operate under the control of the controller 90. The first motor 101 may be connected to, e.g., the first rotating part 20 to transfer rotational power. Although not shown, the first motor 101 and the first rotating part 20 may be connected by power transmission members such as shafts, gears, or gearing.

According to an embodiment, the second motor 111 may operate under the control of the controller 90. The second motor 111 may be connected to, e.g., the second rotating part 30 to transfer rotational power. Although not shown, the second motor 111 and the second rotating part 30 may be connected by power transmission members such as shafts, gears, or gearing.

According to an embodiment, the mobile robot 1 may further include a touch sensor 150. The touch sensor 150 may detect, e.g., whether the mobile robot 1 is in contact from the outside. According to an embodiment, the controller 90 may control the operation of the first valve assembly 71 or the second valve assembly 72 based on the information received from the touch sensor 150. For example, the controller 90 may measure the number of touches of a detection object (e.g., a pet) to the mobile robot 1 using the touch sensor 150.

According to an embodiment, the controller 90 may calculate the degree of interest of the detection object (e.g., a pet) using the touch sensor 150 and the distance sensor 42. For example, the controller 90 may determine that the degree of interest decreases as the frequency at the detection object (e.g., a pet) touches the mobile robot 1 decreases, and may determine that the degree of interest increases as the frequency at which touches the mobile robot 1 increases. For example, the controller 90 may determine that the degree of interest decreases as the distance between the detection object (e.g., the pet) and the mobile robot 1 increases, and determine that the degree of interest increases as the distance decreases. For example, the controller 90 may measure the average distance between the detection object (e.g., a pet) and the mobile robot 1 for a predetermined time and determine the degree of interest based on the average distance. For example, the controller 90 may determine the degree of interest by measuring the number of touches of the detection object (e.g., a pet) to the mobile robot 1 for a predetermined time. The controller 90 may open the first valve assembly 71 or the second valve assembly 72 when the degree of interest of the detection object (e.g., a pet) calculated using the touch sensor 150 and the distance sensor 42 is lower than a predetermined reference value. When the first valve assembly 71 or the second valve assembly 72 is opened, the odor of the odorous substance S may be diffused to the outside, thereby causing the pet's interest in the mobile robot 1.

For example, the controller 90 may measure the distance to the detection object (e.g., a pet) every predetermined time interval, and may open the first valve assembly 71 or the second valve assembly 72 when the distance between the mobile robot 1 and the detection object (e.g., a pet) increases. For example, the controller 90 may measure the number of touches of the mobile robot to the detection object (e.g., the pet) every predetermined time interval, and may open the first valve assembly 71 or the second valve assembly 72 when the number of touches decreases.

Figure 5:
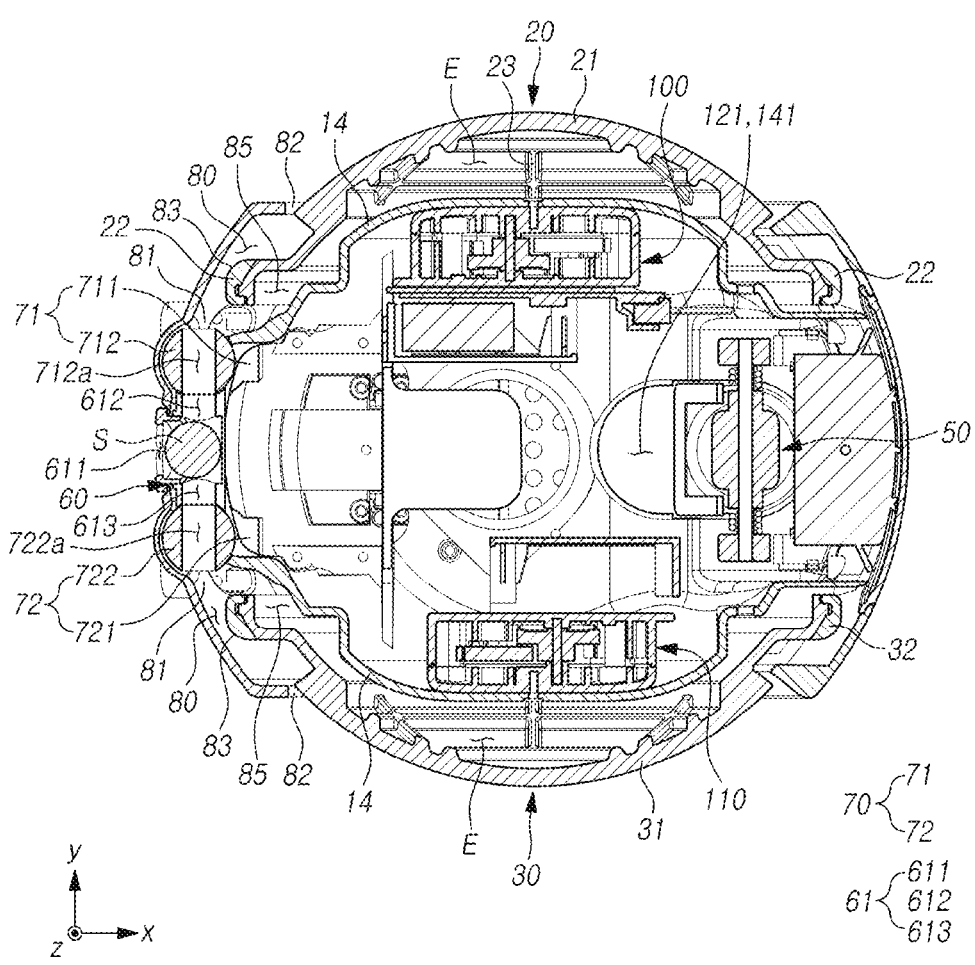
FIG. 5 is a cross-sectional view illustrating the mobile robot of FIG. 1.

For example, the controller 90 may adjust the degree of opening and closing according to the degree of rotation of the first valve (e.g., the first valve 712 of FIG. 5) or the second valve (e.g., the second valve 722 of FIG. 5). For example, the controller 90 may independently control the first valve motor (e.g., the first valve motor 711 of FIG. 5) and the second valve motor (e.g., the second valve motor 721 of FIG. 5) to adjust the degree to which the odor diffuses to the left or right side of the main body 10.

According to an embodiment, the mobile robot 1 may further include a weight sensor 160. The weight sensor 160 may be disposed to detect, e.g., the weight of the odorous substance S contained in the storage box 60. The weight sensor 160 may be disposed, e.g., under the storage box 60 to detect the weight of the odorous substance S. The controller 90 may continuously measure the weight of the odorous substance S using, e.g., the weight sensor 160. For example, when the weight of the odorous substance S is reduced by a predetermined ratio or less to the initial weight, the controller 90 may determine that the odorous substance S needs to be replaced. Here, the preset ratio may be 50%, but is exemplary and is not limited thereto.

According to an embodiment, the mobile robot 1 may further include a pH sensor 170. The pH sensor 170 may be disposed to detect, e.g., the acidity of the odorous substance S. The pH sensor 170 may be disposed adjacent to, e.g., at least one opening 61 of the storage box 60. The controller 90 may continuously measure the acidity of the odorous substance S using, e.g., the pH sensor 170. For example, when the acidity of the odorous substance S is changed by a predetermined value or more compared to the initial acidity, the controller 90 may determine that the odorous substance S needs to be replaced.

When the controller 90 determines that the odorous substance S needs to be replaced, the controller 90 may visually or audibly provide the user with an alarm indicating that the odorous substance S needs to be replaced. Further, the controller 90 may transmit a signal indicating that the odorous substance S needs to be replaced to a terminal connected to the mobile robot 1 using the wireless communication unit 120.

FIG. 5 is a cross-sectional view illustrating the mobile robot of FIG. 1.

According to an embodiment, the mobile robot 1 may include an odor discharge flow path 80 or a transfer flow path 85.

According to an embodiment, the odor discharge flow path 80 may be disposed to connect the storage box 60 to the outside of the main body 10. The odor discharge flow path 80 may include an inlet 81 through which odors are introduced from the storage box 60 at one end of the odor discharge flow path 80 and an outlet 82 through which odors are discharged to the outside of the main body 10 at the other end of the odor discharge flow path 80. In other words, the odor discharge flow path 80 may be formed to discharge odors from the storage box 60 to the outside of the main body 10.

According to an embodiment, a portion of the odor discharge flow path 80 may form a curved surface 83 protruding inward. The odor introduced from the storage box 60 may move along the protruding curved surface 83 and be discharged to the outside of the main body 10. For example, the odor may move along the flow path surface due to the Coanda effect caused by the curved surface 83, and may be effectively discharged to the outside. The curved surface 83 may be formed by, e.g., the first roller 22 or the second roller 32 that forms a portion of the odor discharge flow path 80. A plurality of odor discharge flow paths 80 may be disposed on two opposite sides of the storage box 60. For example, an odor discharge flow path 80 forming a passage between the first valve assembly 71 and the outside of the main body 10, and an odor discharge flow path 80 forming a passage between the second valve assembly 72 and the outside of the main body 10 may be disposed.

The odor discharge flow path 80 is a passage through which the odor of the odorous substance S located in the storage box 60 is discharged to the outside, and may be disposed with a separate tube, but is not limited thereto. As illustrated, the odor discharge flow path 80 may refer to a space formed by the lower frame 14, the housing 12, or the rotating part (the first rotating part 20 or the second rotating part 30). For example, the odor discharge flow path 80 may be surrounded by the lower housing 12 and the rotating part (the first rotating part 20 or the second rotating part 30). In other words, the odor discharge flow path 80 may form a portion of the outer appearance of the main body 10. The shape of the odor discharge flow path 80 may vary depending on the shape of a portion of the exterior of the main body 10.

The odor discharge flow path 80 may be disposed, e.g., outside the transfer flow path 85. For example, the odor discharge flow path 80 may be disposed in front of the transfer flow path 85 (e.g., in the x-axis direction). The odor discharge flow path 80 may be disposed, e.g., inside the front surface of the lower housing 12.

According to an embodiment, the transfer flow path 85 may be disposed so that one end of the transfer flow path 85 is connected to the odor discharge flow path 80 and the other end the transfer flow path 85 is connected to the inner space E of the first rotating part 20 or the second rotating part 30. The transfer flow path 85 may be disposed to transfer, e.g., the flow of air generated by the rotation of the first rotating part 20 or the second rotating part 30 to the odor discharge flow path 80. In other words, the transfer flow path 85 may be disposed to guide the air flowed by the rotation of the first rotating part 20 or the second rotating part 30 to the odor discharge flow path 80.

When the first rotating part 20 or the second rotating part 30 is rotated by the first driving unit 100 or the second driving unit 110, a vortex of air may be generated in the inner space E of the first rotating part 20 or the second rotating part 30. The vortex generated in the inner space E may flow to the odor discharge flow path 80 through the transfer flow path 85. Accordingly, the odorous substance S may not simply diffuse to the outside through the odor discharge flow path 80, but may more rapidly diffuse the odor to a distant place by the flow of air supplied by the odor transfer flow path 85. As a result, there is an advantage that odors may be effectively transferred to the pet staying far from the mobile robot 1 due to low interest.

The transfer flow path 85 may be disposed with a separate tube, but is not limited thereto. As illustrated, the transfer flow path 85 may refer to a space formed between the lower frame 14 or the rotating part (the first rotating part 20 or the second rotating part 30).

According to an embodiment, the storage box 60 may include a first opening 611, a second opening 612, or a third opening 613. The first opening 611 may be open, e.g., in an outward direction (e.g., a rear direction or a −x-axis direction) of the main body 10. The second opening 612 and the third opening 613 may be formed, e.g., on two opposite sides of the storage box 60. For example, the second opening 612 and the third opening 613 may be formed inside the main body 10. For example, the second opening 612 and the third opening 613 may be formed at positions facing each other. However, the positions of the first to third openings illustrated are exemplary, and the number or position of the openings is not limited thereto.

For example, the user may put the odorous substance S capable of leading to interest of a pet, such as feed, in the storage box 60 through the first opening 611. The first opening 611 may be formed with, e.g., a door 62. The second opening 612 and the third opening 613 may be connected to the odor discharge flow path 80 that diffuses the odorous substance S. The second opening 612 may be opened and closed by, e.g., the first valve 71. The third opening 613 may be opened and closed by, e.g., the second valve 72.

Figure 6:
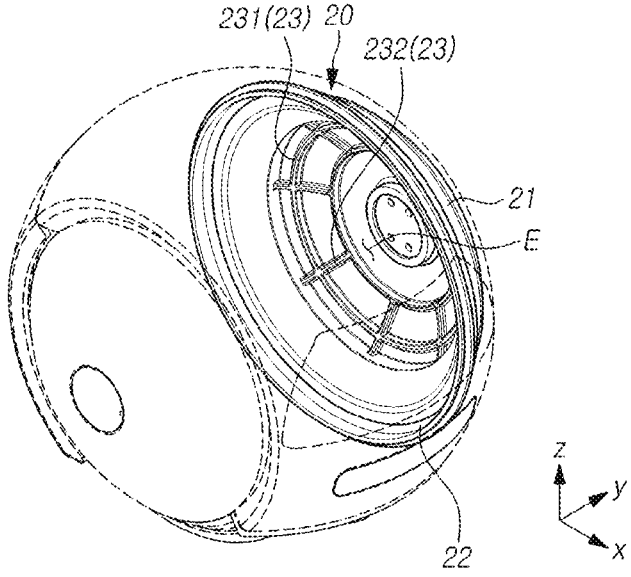
FIG. 6 is a view illustrating an inside of one rotating part according to an embodiment of the disclosure.

FIG. 6 is a view illustrating an inside of one rotating part according to an embodiment of the disclosure.

The rotating part illustrated in FIG. 6 may be one of the first rotating part 20 or the second rotating part 30 of FIG. 3, and is described below with reference to the first rotating part 20. Therefore, the configuration described below may also be included in the second rotating part 30.

According to an embodiment, the first rotating part 20 may include a plurality of ribs 23. The plurality of ribs 23 may protrude, e.g., inward of the first rotating part 20 (especially, the first cover 21). When the first rotating part 20 is rotated by the first driving unit (e.g., the first driving unit 100 of FIG. 5), a vortex may be formed by the plurality of ribs 23 in the inner space E of the first rotating part 20. According to an embodiment, the plurality of ribs 23 may include a circular rib 231 or a vertical rib 232. The plurality of ribs 23 may also be composed of ribs of various shapes.

Figure 7:
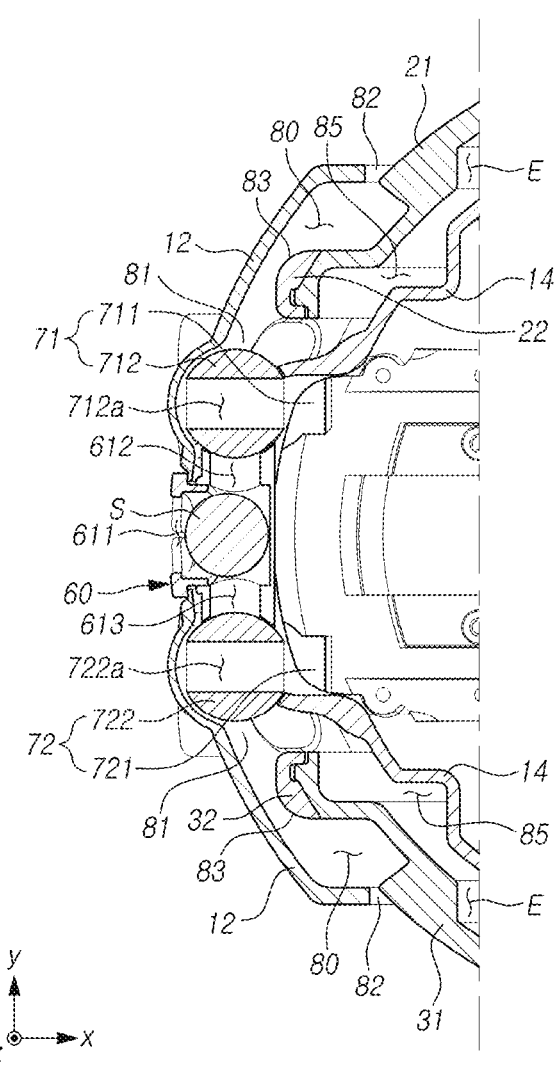
FIG. 7 is an enlarged view illustrating a closed state of a valve in a mobile robot according to an embodiment of the disclosure.
Figure 8:
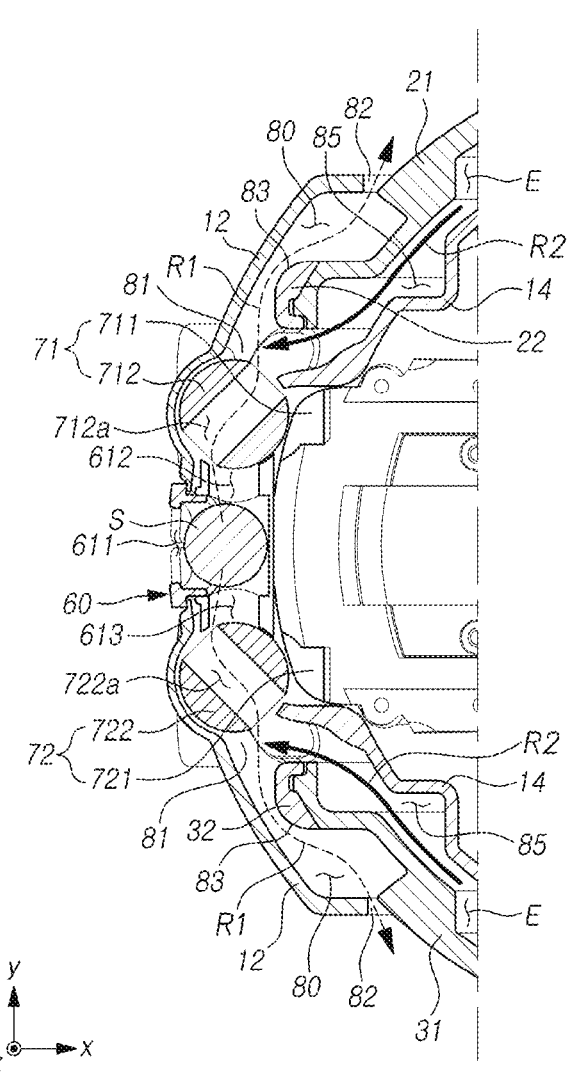
FIG. 8 is an enlarged view illustrating a partially opened state of a valve in a mobile robot according to an embodiment of the disclosure.
Figure 9:
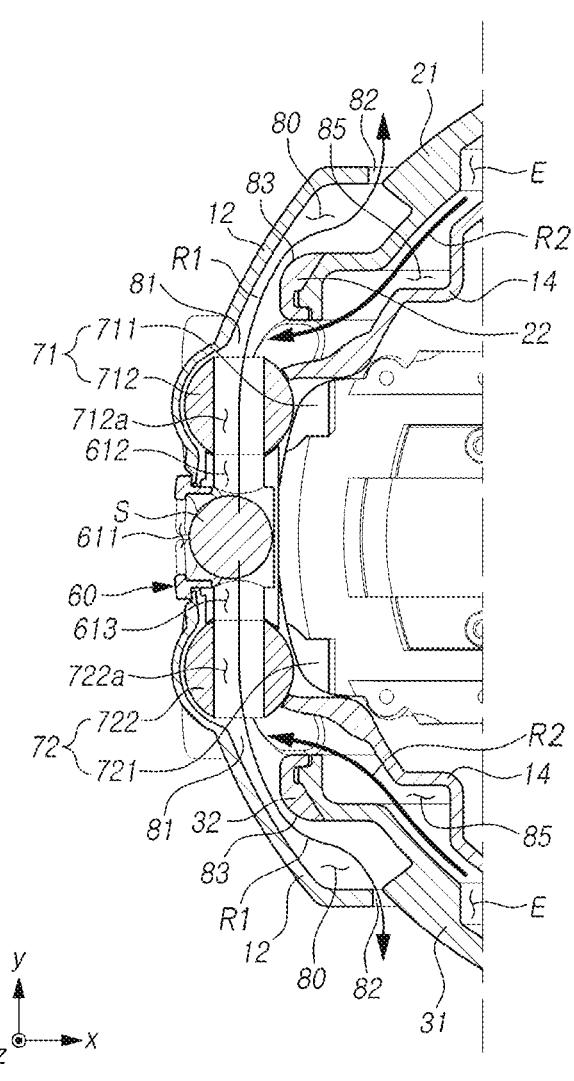
FIG. 9 is an enlarged view illustrating a fully opened state of a valve in a mobile robot according to an embodiment of the disclosure.

FIG. 7 is an enlarged view illustrating a closed state of a valve in a mobile robot according to an embodiment of the disclosure. FIG. 8 is an enlarged view illustrating a partially opened state of a valve in a mobile robot according to an embodiment of the disclosure. FIG. 9 is an enlarged view illustrating a fully opened state of a valve in a mobile robot according to an embodiment of the disclosure.

The mobile robot 1 illustrated in FIGS. 7 to 9 may be entirely or partially the same as the mobile robot 1 illustrated in FIGS. 1 to 3. FIGS. 7 to 9 are views illustrating a process of opening and closing the storage box 60.

The first valve 712 or the second valve 722 illustrated may be a ball valve, and may have a spherical shape, and may include a first through portion 712*a* or a second through portion 722*a* through which a fluid may pass. The first valve 712 of the first valve assembly 71 and the second valve 722 of the second valve assembly 72 may be rotated clockwise or counterclockwise with respect to the drawings.

As illustrated in FIG. 7, in the closed state of the storage box 60, the first through portion 712*a* and the second through portion 722*a* may be disposed to face forward (e.g., in the x-axis direction). The first valve 712 and the second valve 722 may rotate clockwise or counterclockwise to open the storage box 60. However, when the first valve 712 and the second valve 722 are not rotated by a predetermined angle or more in the state of FIG. 7, the first valve 712 and the second valve 722 are not opened. For example, the predetermined angle may be about 45 degrees, but is not limited thereto.

FIG. 8 illustrates a state in which the first valve 712 and the second valve 722 are rotated by a predetermined angle, i.e., a state in which the storage box 60 starts to be opened. From the state of FIG. 8, the degree of opening may be adjusted according to the rotation of the first valve 712 and the second valve 722.

FIG. 9 is a view illustrating a state in which the first valve 712 and the second valve 722 are rotated about 90 degrees in the clockwise direction (direction (1)) or the counterclockwise direction (direction (2)) in the state of FIG. 7. In other words, FIG. 9 is a view illustrating a state in which the first valve 712 and the second valve 722 fully open the storage box 60. Accordingly, the controller 90 may control the first valve motor 711 and the second valve motor 721 to adjust the degree of rotation of the first valve 712 and the second valve 722 within 45 degrees to 90 degrees, thereby adjusting the degree of opening of the storage box 60. In other words, the controller 90 may control the degree of diffusion of the odorous substance S by determining the degree of opening of several steps within 45 degrees to 90 degrees. Here, the first valve motor 711 and the second valve motor 721 may be step motors, but are not limited thereto.

Referring to FIGS. 8 and 9, a path through which the odor of the odorous substance S diffuses to the outside is illustrated.

The odor of the odorous substance S may be discharged to the outside through a first path R1 passing through the odor discharge flow path 80 after passing through the first valve assembly 71 or the second valve assembly 72 in the storage box 60. The first path R1 may have, e.g., a path in which the odor of the odorous substance S moves along the curved surface 83 of the odor discharge flow path 80.

When the first rotating part 20 or the second rotating part 30 rotates, a vortex of air may occur in the inner space E. The vortex of air may be transferred to the odor discharge flow path 80 through the second path R2 through the transfer flow path 85. The odor of the odorous substance S may be moved more rapidly to the first path R1 by the flow of air received from the transfer flow path 85. In other words, the odor of the odorous substance S may be diffused faster and farther to the outside by the flow of air transferred through the second path R2.

Figure 10:
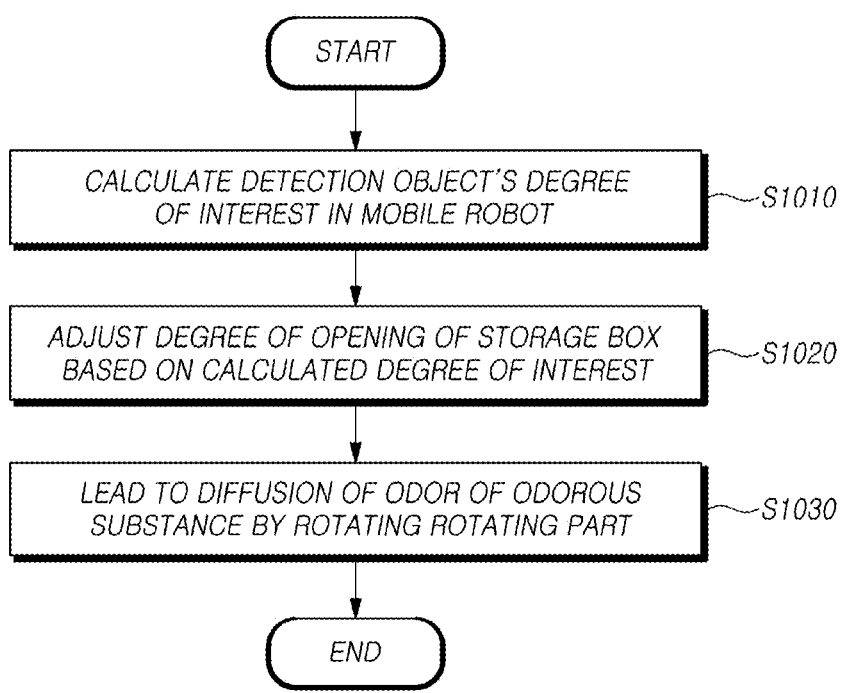
FIG. 10 is a flowchart illustrating a method for controlling a mobile robot according to an embodiment of the disclosure.

FIG. 10 is a flowchart illustrating a method for controlling a mobile robot according to an embodiment of the disclosure.

The control method of the mobile robot 1 illustrated in FIG. 10 may be a description of the control method of the mobile robot 1 described with reference to FIGS. 1 to 4. Hereinafter, it is described with reference to FIGS. 1 to 4 and 10.

The controller 90 may calculate a detection object's degree of interest in the mobile robot 1 (S1010). Here, the detection object may refer to a pet. The controller 90 may calculate the degree of interest in the mobile robot 1 of the detection object using, e.g., the distance sensor 42 or the touch sensor 150, but is not limited thereto, and various other types of sensors may be used.

For example, the controller 90 may calculate the degree of interest based on the periodically measured distance between the detection object and the mobile robot 1. For example, when the real time-measured distance between the detection object and the mobile robot 1 is a preset ratio larger than or equal to the previously measured distance value, it may be determined that the degree of interest has decreased. For example, when the average distance between the detection object and the mobile robot 1 is 20 cm and the predetermined ratio is 150%, if the distance between the detection object and the mobile robot 1 measured in real time is 30 cm or more, the controller 90 may determine that the degree of interest of the detection object has decreased. Here, the average distance may be an average of distance values between the detection object and the mobile robot 1 measured for a predetermined time. Further, the controller 90 may calculate the degree of interest of the detection object by setting various criteria using the distance sensor 42.

For example, the controller 90 may calculate the degree of interest based on the number of touches periodically measured. For example, if the number of touches of the detection object to the mobile robot 1, as measured in real time, is a preset ratio smaller than the previously measured number of touches, it may be determined that the degree of interest has decreased. For example, when the average number of touches of the detection object to the mobile robot 1 is 10 and the preset ratio is 50%, if the number of touches of the detection object to the mobile robot 1 measured in real time is less than or equal to 5, the controller 90 may determine that the degree of interest of the detection object has decreased. Here, the number of touches may be a value measured for a predetermined time. Further, the controller 90 may calculate the degree of interest of the detection object by setting various criteria using the touch sensor 150.

After calculating the degree of interest, the controller 90 may adjust the degree of odor diffusion of the odorous substance S according to the calculated degree of interest (S1020). The controller 90 may control, e.g., the first valve assembly 71 and the second valve assembly 72 disposed at the second opening 612 and the third opening 613 of the storage box 60 to control the diffusion of the odor.

The opening of the storage box 60 may be divided into a plurality of steps according to the degree of opening. For example, the controller 90 may divide the opening steps into 10 steps and set the least opened state to a first step, and sequentially open at each step up, so that it is fully opened at the tenth step. For example, the controller 90 may adjust the opening step of the first valve assembly 71 or the second valve assembly 72 according to the calculated degree of interest.

For example, in a state in which the storage box 60 is opened in the first step, when determining that the degree of interest in the mobile robot 1 of the detection object has decreased, the controller 90 may open the storage box 60 in the second step. By adjusting the degree of opening in this way, it is possible to lead to interest of the detection object, i.e., a pet.

After adjusting the degree of diffusion of the odorous substance S, the controller 90 may lead to or accelerate diffusion of the odor by rotating the rotating part (the first rotating part 20 or the second rotating part 30) (S1030). The controller 90 may rotate, e.g., the first rotating part 20 or the second rotating part 30 to lead to or accelerate the diffusion of odors. An inner space E is formed in the first rotating part 20 or the second rotating part 30 as described above with reference to FIG. 6, and if the first rotating part 20 or the second rotating part 30 rotates, an air flow may be formed in the inner space E. The flow of air may be diffused to the outside together with the odor passing through the odor discharge flow path 80 through the transfer flow path 85.

For example, the controller 90 may rotate only one of the first rotating part 20 or the second rotating part 30 to control the mobile robot 1 to rotate and diffuse odors within a predetermined range. Alternatively, the controller 90 may rotate the first rotating part 20 and the second rotating part 30 in opposite directions to control the mobile robot 1 to diffuse the odor while rotating in place. Alternatively, the controller 90 may control the first rotating part 20 and the second rotating part 30 to diffuse the odorous substance while moving around the detection object. Alternatively, the controller 90 may open the first valve assembly 71 or the second valve assembly 72 while the mobile robot 1 is driving to naturally diffuse the odor.

Figure 11:
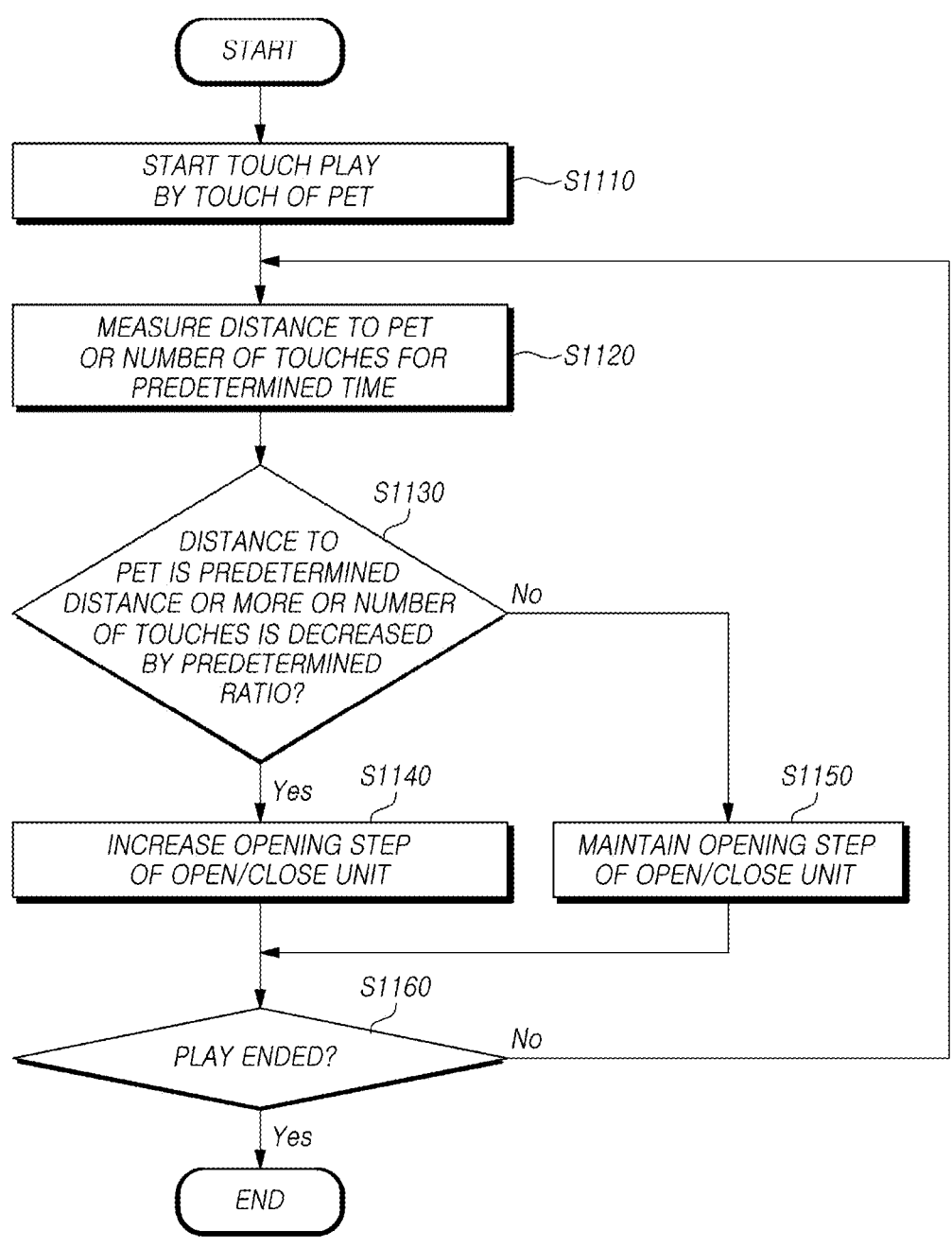
FIG. 11 is a flowchart illustrating a method for controlling a mobile robot when a pet starts to play according to an embodiment of the disclosure.

FIG. 11 is a flowchart illustrating a method for controlling a mobile robot when a pet starts to play according to an embodiment of the disclosure.

The flowchart of FIG. 11 is a flowchart illustrated based on the control method of FIG. 10 to describe one of specific implementation examples of the control method of the mobile robot according to an embodiment of the disclosure, and the disclosure is not limited thereto, and various other control operations may be performed. Hereinafter, it is described with reference to FIGS. 1 to 4 and 11. In the following description, the pet may be an example of the detection object.

The controller 90 may start the touch play by the touch of the pet (S1110). In other words, when the controller 90 detects that the pet has touched the mobile robot 1, the controller 90 may determine that the pet is in a bored state and start the touch play. Here, the touch play may refer to an operation of the mobile robot 1 that leads to interest of the pet while driving around the pet in various directions and at various speeds. The pet may be interested in the mobile robot 1 operating in various ways.

The controller 90 may measure the distance to the pet or the number of touches during the touch play for a predetermined time (S1120). For example, the controller 90 may set the predetermined time to 20 seconds and measure the average distance to the pet for 20 seconds. Also, the controller 90 may measure the number of touches of the pet to the mobile robot 1 for 20 seconds. The measured distance and the number of touches may be stored in the memory 140. The predetermined time may be varied.

Based on the measured distance and the number of touches, the controller 90 may determine whether the distance to the pet is larger than or equal to a predetermined distance or whether the number of touches is reduced by a predetermined ratio or more (S1130). For example, the controller 90 may compare the real time-measured distance and number of touches with the distance and number of touches, respectively, previously stored in the memory 140 to determine whether the distance between the mobile robot 1 and the pet has been a predetermined distance or more or whether the number of touches has been decreased by a predetermined ratio. Here, the predetermined distance or the predetermined ratio may be previously stored in the memory, but is not limited thereto, and may be changed by the user settings.

When it is determined that the distance to the pet is increased by the predetermined distance or more or the number of touches is decreased by the predetermined ratio or more, the controller 90 may increase the opening step of the valve assembly 70 (S1140). Here, the opening steps may include 10 steps as described with reference to FIG. 10, but are not limited thereto. When the controller 90 increases the opening step of the valve assembly 70, the controller 90 may increase the opening step one by one, but is not limited thereto.

When the controller 90 determines that the distance to the pet is not increased by the predetermined distance or more and the number of touches is not decreased by the predetermined ratio or more, the controller 90 may maintain the opening step of the valve assembly 70 (S1150). Alternatively, the controller 90 may reduce the diffusion of the odor by decreasing the opening step without maintaining the opening step in step S1150.

After performing step S1140 or step S1150, the controller 90 may determine whether the play has ended (S1160). For example, when a preset time elapses after the start of the play, the controller 90 may determine that the play has ended. Here, the preset time may be set by the user. Alternatively, when the opening step of the valve assembly 70 is the maximum opening step and the degree of interest of the pet has decreased, the controller 90 may determine that the play has ended. Further, various methods for determining whether the play has ended may be determined. When the controller 90 determines that the play has ended, the controller 90 terminates the instant algorithm. On the other hand, when the controller 90 determines that the play has not ended, the controller 90 may return to step S1120 to continuously calculate the degree of interest of the pet.

Figure 12:
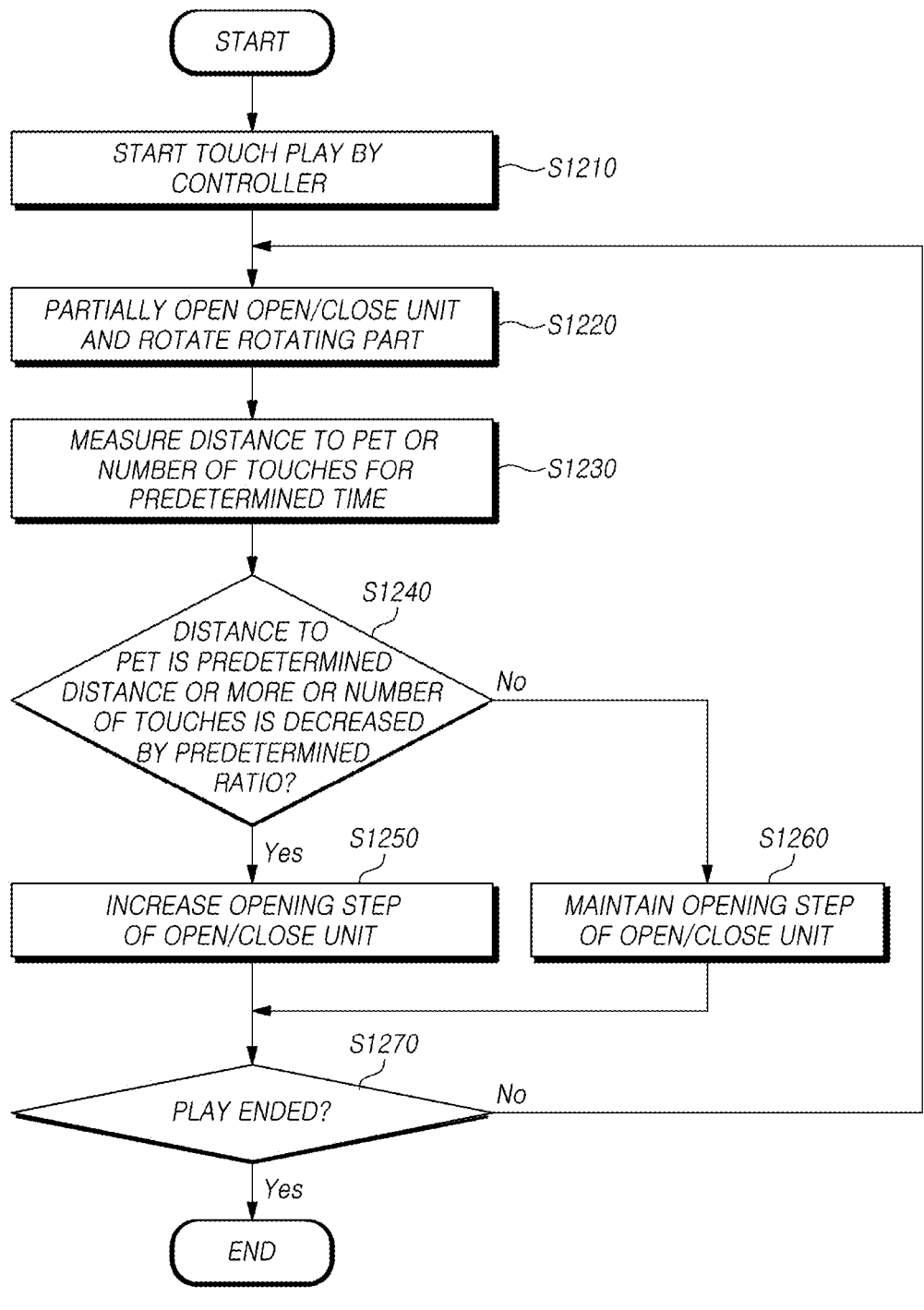
FIG. 12 is a flowchart illustrating a method for controlling a mobile robot when a controller starts to play according to an embodiment of the disclosure.

FIG. 12 is a flowchart illustrating a method for controlling a mobile robot when a controller starts to play according to an embodiment of the disclosure.

The flowchart of FIG. 12 is a flowchart illustrated based on the control method of FIG. 10 to describe one of specific implementation examples of the control method of the mobile robot according to an embodiment of the disclosure, and the disclosure is not limited thereto, and various other control operations may be performed. Hereinafter, it is described with reference to FIGS. 1 to 4 and 12. Further, a description overlapping those found in the description of FIG. 11 will be omitted.

The controller 90 may start the touch play (S1210). For example, the controller 90 may start the touch play at a time stored in the memory 140 or at a time determined by the user's settings. For example, the controller 90 may be set to start the touch play when a predetermined time elapses after the user goes out. The controller 90 may be set to start the touch play at a predetermined time. Further, the controller 90 may determine when the touch play starts by various settings.

After starting the touch play, the controller 90 may perform control to open a portion of the valve assembly 70 and rotate the first rotating part 20 or the second rotating part 30 (S1220). In FIG. 12, unlike in FIG. 11, it should be first to lead to interest of the pet. Thus, it is possible to lead to interest of the pet by partially opening the valve assembly 70 to release odor and accelerating the diffusion of odor using a vortex generated by rotating the first rotating part 20 or the second rotating part 30.

The controller 90 may measure the distance to the pet or the number of touches during the touch play for a predetermined time (S1230). Step S1230 may correspond to step S1120 of FIG. 11.

Based on the measured distance and the number of touches, the controller 90 may determine whether the distance to the pet is larger than or equal to a predetermined distance or whether the number of touches is reduced by a predetermined ratio or more (S1240). Step S1240 may correspond to step S1130 of FIG. 11.

When it is determined that the distance to the pet is increased by the predetermined distance or more, or the number of touches is decreased by the predetermined ratio or more, the controller 90 may increase the opening step of the valve assembly 70 (S1250). Step S1250 may correspond to step S1140 of FIG. 11.

When the controller 90 determines that the distance to the pet is not increased by the predetermined distance or more and the number of touches is not decreased by the predetermined ratio or more, the controller 90 may maintain the opening step of the valve assembly 70 (S1260). Step S1260 may correspond to step S1150 of FIG. 11.

After performing step S1140 or step S1150, the controller 90 may determine whether the play has ended (S1270). Step S1270 may correspond to step S1160 of FIG. 11.

The terms as used herein are provided merely to describe some embodiments thereof, but are not intended to limit the disclosure. As used herein, the singular forms "a," "an," and "the" are intended to include the plural forms as well, unless the context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, the terms "first" and "second" may modify various components regardless of importance and/or order and are used to distinguish a component from another without limiting the components.

As used herein, the terms "configured to" may be interchangeably used with the terms "suitable for," "having the capacity to," "designed to," "adapted to," "made to," or "capable of" depending on circumstances. The term "configured to" does not essentially mean "specifically designed in hardware to." Rather, the term "configured to" may mean that a device can perform an operation together with another device or parts. For example, a 'device configured (or set) to perform A, B, and C' may be a dedicated device to perform the corresponding operation or may mean a general-purpose device capable of various operations including the corresponding operation.

Meanwhile, the terms "upper side", "lower side", and "front and rear directions" used in the disclosure are defined with respect to the drawings, and the shape and position of each component are not limited by these terms.

In the disclosure, the above-described description has been made mainly of specific embodiments, but the disclosure is not limited to such specific embodiments, but should rather be appreciated as covering all various modifications, equivalents, and/or substitutes of various embodiments.

What is claimed is:

1. A mobile robot, comprising:
a main body;
a rotating part configured to rotate to move the main body;
a storage box inside the main body to store an odorous substance;
an odor discharge flow path through which, when the odorous substance is stored in the storage box, odor from the odorous substance is passable to be discharged to an outside of the main body;
a valve assembly configured to open or close to control diffusion of the odor through the odor discharge flow path;
a transfer flow path configured to guide a flow of air generated by rotation of the rotating part to the odor discharge flow path; and
a controller configured to control rotation of the rotating part and opening and closing of the valve assembly.

2. The mobile robot of claim 1,
wherein the rotating part includes a rib protruding inward.

3. The mobile robot of claim 2,
wherein the rotating part and the rib are configured so that, when the rotating part rotates, the flow of air is generated by the rib.

4. The mobile robot of claim 1,
wherein a portion of the odor discharge flow path is configured to form a curved surface protruding inward so that the flow path the air flows along is the curved surface.

5. The mobile robot of claim 1,
wherein the storage box includes an opening to allow the odorous substance to be drawn in or out of the storage box, and a door configured to open or close the opening.

6. The mobile robot of claim 5,
wherein the door is behind the main body.

7. The mobile robot of claim 1, further comprising:
a distance sensor configured to detect a distance to a detection object; and
a touch sensor configured to detect contact of the detection object with the mobile robot,
wherein the controller is configured to measure a degree of interest of the detection object using at least one of the distance detected by the distance sensor or the contact detected by the touch sensor.

8. The mobile robot of claim 7, wherein the controller is configured to:
determine, using at least one of the distance detected by the distance sensor or the contact detected by the touch sensor, that the degree of interest decreases as the distance to the detection object increases or that the degree of interest decreases as a frequency at which contact with the mobile robot decreases; and
open the valve assembly when the degree of interest of the detection object is lower than a preset reference value.

9. The mobile robot of claim 1, wherein
the valve assembly is configured to open or close between the storage box and the odor discharge flow path, and the controller is configured to control the valve assembly to release odor of the odorous substance from the storage box to the odor discharge flow path.

10. The mobile robot of claim 1, further comprising:

a weight sensor configured to detect a weight of the odorous substance stored in the storage box, wherein the controller is configured to visually or audibly provide an alarm indicating that replacement of the odorous substance stored in the storage box is required when the weight detected by the weight sensor decreases by a preset ratio or less to an initial weight.

11. The mobile robot of claim 1, further comprising:

a pH sensor configured to detect an acidity of an odorous substance stored in the storage box, wherein the controller is configured to visually or audibly provide an alarm indicating that replacement of an odorous substance stored in the storage box is required when the acidity detected by the pH sensor is changed by a preset value or more relative to an initial acidity.

12. The mobile robot of claim 1, wherein the valve assembly includes:

a valve positioned between the storage box and an inlet of the odor discharge flow path; and a valve motor configured to rotate the valve to open or close a space between the storage box and the odor discharge flow path.

13. A method for controlling a mobile robot, the method comprising:

calculating a degree of interest of a detection object using at least one of a distance detected by a distance sensor or a contact detected by a touch sensor;

controlling, based on the calculated degree of interest, diffusion of an odor of an odorous substance stored in a storage box by controlling a valve assembly; and controlling rotation of a rotating part to move the mobile robot and so that a flow of air generated by rotation of the rotating part is guided to the storage box.

14. The method of claim 13, further comprising:

determining whether the degree of interest decreases while the mobile robot moves; and controlling the valve assembly to increase a degree of opening of the storage box when the degree of interest is determined to decrease while the mobile robot moves.

15. The method of claim 13, wherein the calculating comprises:

determining that the degree of interest decreases as a distance to the detection object increases or that the degree of interest decreases as a frequency at which the detection object touches the mobile robot decreases, and the method further comprises:

controlling the valve assembly based on determining that the degree of interest decreases.

* * * * *